United States Patent
Kim

(10) Patent No.: US 11,979,305 B2
(45) Date of Patent: May 7, 2024

(54) METHOD AND SYSTEM FOR DIAGNOSING COMMUNICATION CHANNEL STATE IN IN-VEHICLE NETWORK

(71) Applicants: Hyundai Motor Company, Seoul (KR); Kia Corporation, Seoul (KR)

(72) Inventor: Beom Sik Kim, Hwaseong-si (KR)

(73) Assignees: Hyundai Motor Company (KR); Kia Corporation (KR)

( * ) Notice: Subject to any disclaimer, the term of this patent is extended or adjusted under 35 U.S.C. 154(b) by 0 days.

(21) Appl. No.: 18/182,698

(22) Filed: Mar. 13, 2023

(65) Prior Publication Data
US 2024/0064080 A1    Feb. 22, 2024

(30) Foreign Application Priority Data
Aug. 22, 2022    (KR) .......................... 10-2022-0105003

(51) Int. Cl.
  *H04L 12/24*    (2006.01)
  *H04L 41/0803*    (2022.01)
  *H04L 43/0823*    (2022.01)
  *H04L 67/12*    (2022.01)
(52) U.S. Cl.
  CPC .......... *H04L 43/0823* (2013.01); *H04L 67/12* (2013.01)
(58) Field of Classification Search
  CPC ............................ H04L 43/0823; H04L 67/12
  USPC ....................................................... 709/223
  See application file for complete search history.

(56) References Cited

U.S. PATENT DOCUMENTS

| | | | | |
|---|---|---|---|---|
| 2007/0026803 A1* | 2/2007 | Malm | ................... | H04L 1/0033 455/67.11 |
| 2016/0381068 A1* | 12/2016 | Galula | ................. | G07C 5/0816 726/23 |
| 2018/0072250 A1* | 3/2018 | Kim | ........................ | H04L 63/08 |
| 2018/0229739 A1* | 8/2018 | Imamoto | ............... | B60W 50/04 |
| 2019/0079842 A1* | 3/2019 | Chae | .................. | G06F 11/3006 |
| 2020/0382597 A1* | 12/2020 | Jung | .................. | H04L 12/4135 |
| 2021/0021530 A1* | 1/2021 | Kim | ........................ | H04W 4/48 |
| 2021/0192867 A1* | 6/2021 | Fang | .................... | G07C 5/0816 |
| 2023/0327956 A1* | 10/2023 | Matsubayashi | ......... | H04L 41/12 370/254 |

FOREIGN PATENT DOCUMENTS

| | | |
|---|---|---|
| KR | 10-2300764 | 9/2021 |
| KR | 10-2355092 | 1/2022 |
| KR | 10-2022-0139153 | 10/2022 |

* cited by examiner

*Primary Examiner* — Moustafa M Meky
*Assistant Examiner* — Elizabeth Kassa
(74) *Attorney, Agent, or Firm* — Fish & Richardson P.C.

(57) ABSTRACT

A method and system for diagnosing a communication channel state in an in-vehicle network includes requesting information on devices connected to a controller, receiving the information on the connected devices from the controller, requesting channel state diagnostics for a channel to which, among the devices connected to the controller, a diagnostics target device is connected, and receiving channel state diagnostics result from the controller, where the channel state diagnostics result includes diagnostic results of some of the devices connected to the controller.

14 Claims, 13 Drawing Sheets

FIG. 14 controller: CTRL 1

CTRL 1
CHIPxxxx
Channel No: 0x01

| item | state value |
|---|---|
| RCD_KEY_CNT | 05 |
| CHIP_ID | 45 |
| DEVICE_ID | 02 |
| CH_NO | 01 |
| DFC FRR A/DFC FRR B | 00 | save

CTRL 1
CHIPxxxx
Channel No: 0x02, 0x03

| item | state value |
|---|---|
| RCD_KEY_CNT | 05 |
| CHIP_ID | 45 |
| DEVICE_ID | 02 |
| CH_NO | 0203 |
| DFC FRR A/DFC FRR B | 0000 | save

CTRL 1
CHIPxxxx
Channel No: 0x03

| item | state value |
|---|---|
| RCD_KEY_CNT | 05 |
| CHIP_ID | 45 |
| DEVICE_ID | 02 |
| CH_NO | 03 |
| DFC FRR A/DFC FRR B | 00 | save

METHOD AND SYSTEM FOR DIAGNOSING COMMUNICATION CHANNEL STATE IN IN-VEHICLE NETWORK

CROSS REFERENCE TO RELATED APPLICATION

The present application claims priority to Korean Patent Application No. 10-2022-0105003, filed on Aug. 22, 2022, the entire contents of which is incorporated herein for all purposes by this reference.

TECHNICAL FIELD

The present invention relates to an in-vehicle network technology and more particularly to a communication method and system for diagnosing devices assigned no D-CAN (diagnosis controller area network) ID(identifier) in a channel selected in an in-vehicle network.

BACKGROUND

The rapid electrification of vehicle parts has increased the type and number of electronic devices (e.g., Electronic Control Units (ECUs)) mounted in vehicles. The electronic devices may be used in a powertrain control system, a body control system, a chassis control system, an in-vehicle network, a multimedia system, and the like. The powertrain control system may refer to an engine control system, an automatic shift control system, and the like. The body control system may refer to a body electronics control system, a convenience device control system, a lamp control system, and the like. The chassis control system may refer to a steering mechanism control system, a brake control system, a suspension control system, and the like. The in-vehicle network may refer to a controller area network (CAN), a FlexRay-based network, a Media Oriented System Transport (MOST)-based network, and the like. The multimedia system may refer to a navigation equipment system, a telematics system, an infotainment system, and the like.

These systems and electronic devices constituting each of the systems are connected through an in-vehicle network, and there is a need for an in-vehicle network for supporting each function of the electronic devices. CAN may support a transmission rate of up to 1 Mbps, automatic retransmission of a collided frame, and error detection based on a cyclic redundancy check (CRC). A FlexRay-based network may support a transmission rate of up to Mbps, simultaneous data transmission through two channels, synchronous data transmission, and the like. The MOST-based network is a communication network for high-quality multimedia and may support a transmission rate of up to 150 Mbps.

However, the vehicle's telematics system, infotainment system, and improved safety system require high transmission rate and system scalability, which are not sufficiently supported by the CAN and FlexRay-based networks. A MOST-based network may support a higher transmission rate than a CAN and Play-Ray-based network, but it costs a lot of money to apply the MOST-based network to all networks of a vehicle. Due to these problems, an Ethernet-based network may be considered as an in-vehicle network. An Ethernet-based network may support bidirectional communication through a pair of wires and a transmission rate of up to 10 Gbps.

In some examples, in the conventional diagnostic communication for diagnosing in-vehicle devices, a D-CAN ID is assigned to a local device connected to the diagnostic device, and entire information of the controller device to which the D-CAN ID is assigned is received.

However, such a conventional technology has drawbacks in that it is difficult to obtain diagnostic information of the remote devices assigned with no D-CAN ID and, when calling in the entire diagnostic value of a controller device assigned with a D-CAN ID, it takes a long time to check and analyze problems of failed devices.

Thus, in this technical field, a need for a technology capable of reducing the cause analysis time by diagnosing failures in remote devices selected in the vehicle.

SUMMARY

The present invention is directed to a communication method and system capable of acquiring diagnostic information of in-vehicle remote devices per network channel.

The present invention is also directed to a communication method and system capable of reducing a cause analysis time by diagnosing failures of remote devices selected in a vehicle.

The technical objects of the present invention are not limited to the aforesaid, and other objects not described herein with be clearly understood by those skilled in the art from the descriptions below.

The in-vehicle device diagnostic method of a diagnostic device includes requesting information on devices connected to a controller, receiving the information on the connected devices from the controller, requesting channel state diagnostics for a channel to which, among the devices connected to the controller, a diagnostics target device is connected, and receiving channel state diagnostics result from the controller, wherein the channel state diagnostics result includes diagnostic results of some of the devices connected to the controller.

Here, the channel state diagnostics result may include an identifier of communication chips in the controller, an identifier (ID) of the controller, and a number of errors occurring on the channel.

Here, the information on the connected device may include an identifier of the controller, a number of physical channels connected to the controller, and information on each respective physical channel connected to the controller.

Here, the information on each respective physical channel may include an identifier of each respective physical channel, identifiers of other controllers connected to each respective physical channels, and identifiers of channels configured in the other controllers.

Here, the step of requesting channel state diagnostics may include transmitting to the controller a channel state monitoring start request for a channel to which the diagnostics target device is connected, receiving a response from the controller in response to the channel state monitoring start request, and transmitting a channel state monitoring start request to the controller.

Here, the channel state monitoring start request may include information on whether the diagnostics target device is a local device or a remote device and information on the channel to which the diagnostics target device is connected.

Here, the response to the channel state monitoring start request may include a data size of the channel state monitor information.

Also, a diagnostic device diagnosing in-vehicle devices includes a processor generating a message requesting information on devices connected to a controller and a channel state diagnostics request message to the controller based on the information on the devices connected to the controller, and a communication unit transmitting the message requesting information on the devices connected to the controller, receiving information on the connected devices from the controller, transmitting a channel state diagnostics request message for the channel to which, among the devices connected to the controller, a diagnostics target device is connected based on the received information, and receiving a channel state diagnostics result from the controller, wherein the channel state diagnostics result comprises a diagnostics result for the diagnostic target device.

Here, the channel state diagnostics result may include an identifier of a communication chip included in the controller, an identifier (ID) of the controller, and a number of errors occurring on the channel.

Here, the information on the connected device may include an identifier of the controller, a number of physical channels connected to the controller, and information on each respective physical channel connected to the controller.

Here, the information on each respective physical channel may include an identifier of each respective physical channel, identifiers of other controllers connected to each respective physical channels, and identifiers of channels configured in the other controllers.

Here, the processor may transmit to the controller a channel state monitoring start request for a channel to which the diagnostics target device is connected, receive a response from the controller in response to the channel state monitoring start request, and transmit a channel state monitoring start request to the controller.

Here, the channel state monitoring start request may include information on whether the diagnostics target device is a local device or a remote device and information on the channel to which the diagnostics target device is connected.

Here, the response to the channel state monitoring start request may include a data size of the channel state monitor information.

In some implementations, it is possible to acquire diagnostic information of remote devices in the vehicle per network channel.

Also, it is possible to reduce the cause analysis time by diagnosing failures of the remote devices selected in the vehicle.

The advantages of the present invention are not limited to the aforesaid, and other advantages not described herein may be clearly understood by those skilled in the art from the descriptions below.

BRIEF DESCRIPTION OF THE DRAWINGS

FIG. 14 is a diagram illustrating another example of a user screen of a diagnostic device.

DETAILED DESCRIPTION

Figure 1:
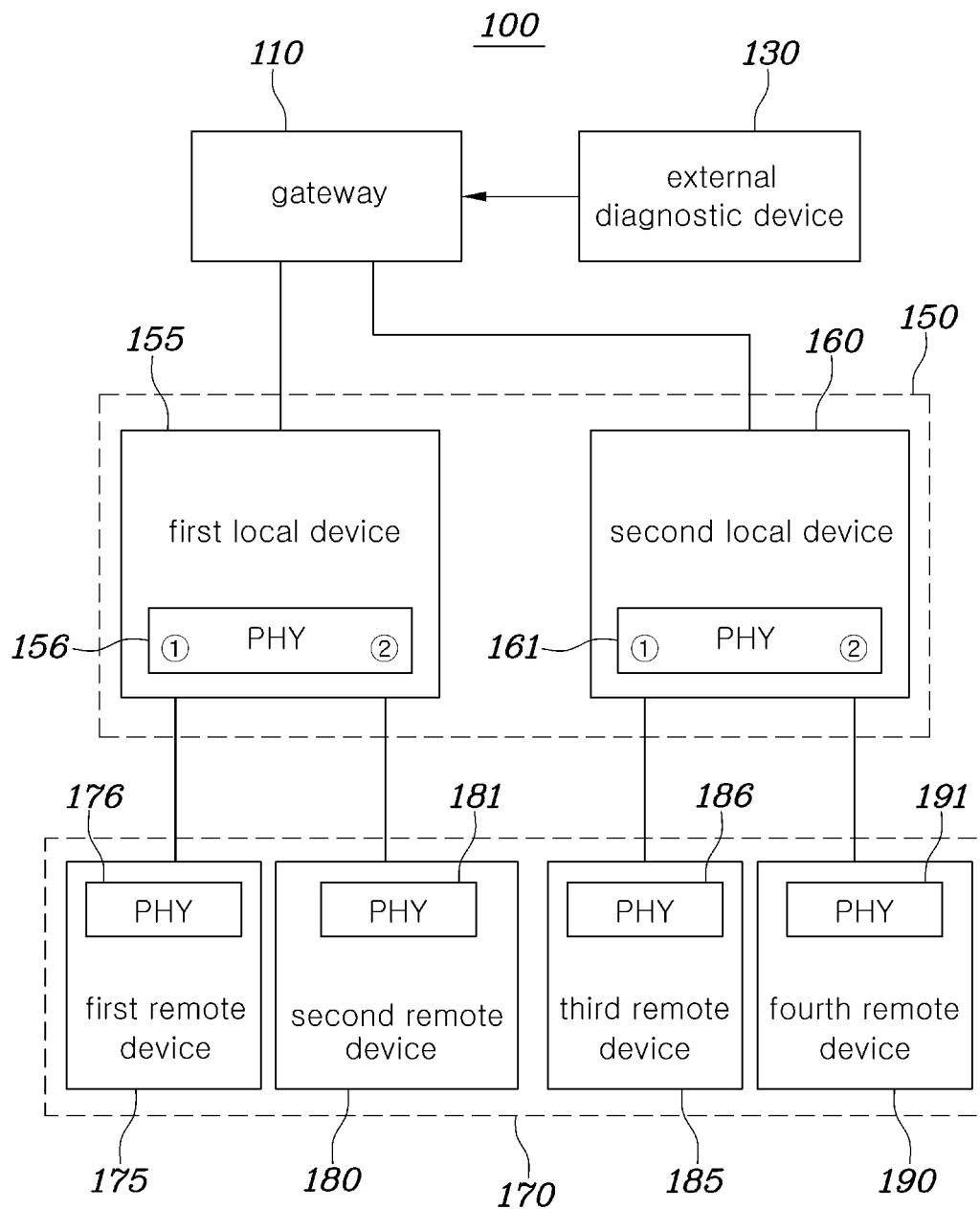
FIG. 1 is a diagram illustrating an example of a conventional in-vehicle diagnostic communication system.

FIG. 1 schematically illustrates a configuration of a conventional vehicle diagnostic communication system.

With reference to FIG. 1, the conventional vehicle diagnostic communication system 100 includes an external diagnostic device 110, a gateway 130, local devices 150, and remote devices 170.

The external diagnostic device 110 diagnoses the communication node belonging to the in-vehicle network through the gateway 130.

The gateway 130 connects different networks. For example, the gateway 130 may connect the external diagnostic device 110 supporting the D-HSCAN communication protocol and the local devices 150 supporting the Ethernet communication protocol.

Each of the local devices 150 may be connected to at least one remote device 170. Each of the local devices 150 may interconnect the remote devices 170 and control the remote devices 170 connected thereto.

The local device 150 may include first and second local devices 155 and 160 and each of the local devices 155 and 160 may be a different Electronic Control Unit (ECU). Here, the first and second local devices 155 and 160 may respectively include at least one physical (PHY) communication module 156 and 161, and each of the physical communication modules 156 and 161 may communicate with the remote devices 170 connected to respective local device through channels set in the communication module.

The remote devices 170 may be included in the vehicle and controlled by the local devices 150, or may communicate with the local devices 150.

Here, the remote devices 170 may include first to fourth remote devices 175, 180, 185, and 190, e.g., the first and second remote devices 175 and 180 may be the first cam 175 and the first display 180, respectively, and the third and fourth remote devices 185 and 190 may be the second cam 185 and the second display 190, respectively.

In this case, the first and second remote devices 175 and 180 may communicate with the first local device 155 through communication channels set in the respective physical (PHY) communication modules 176 and 181, and the third and fourth remote devices 185 and 190 may communicate with the second local device 160 through communication channels set in the respective physical communication modules 186 and 191.

In the conventional diagnostic communication system 100 as configured above, D-CAN IDs are assigned to local devices 155 and 160 connected to the external diagnostic device 110 and overall information of the local devices 155 and 160 assigned the D-CAN IDs is received.

However, such a prior art has drawbacks in that it is difficult to obtain diagnostic information of a remote devices 170 assigned with no D-CAN ID and, when calling in the entire diagnostic value of the control devices 155 and 160 assigned with the D-CAN IDs, it takes a long time to check and analyze problems of failed devices.

Figure 2:
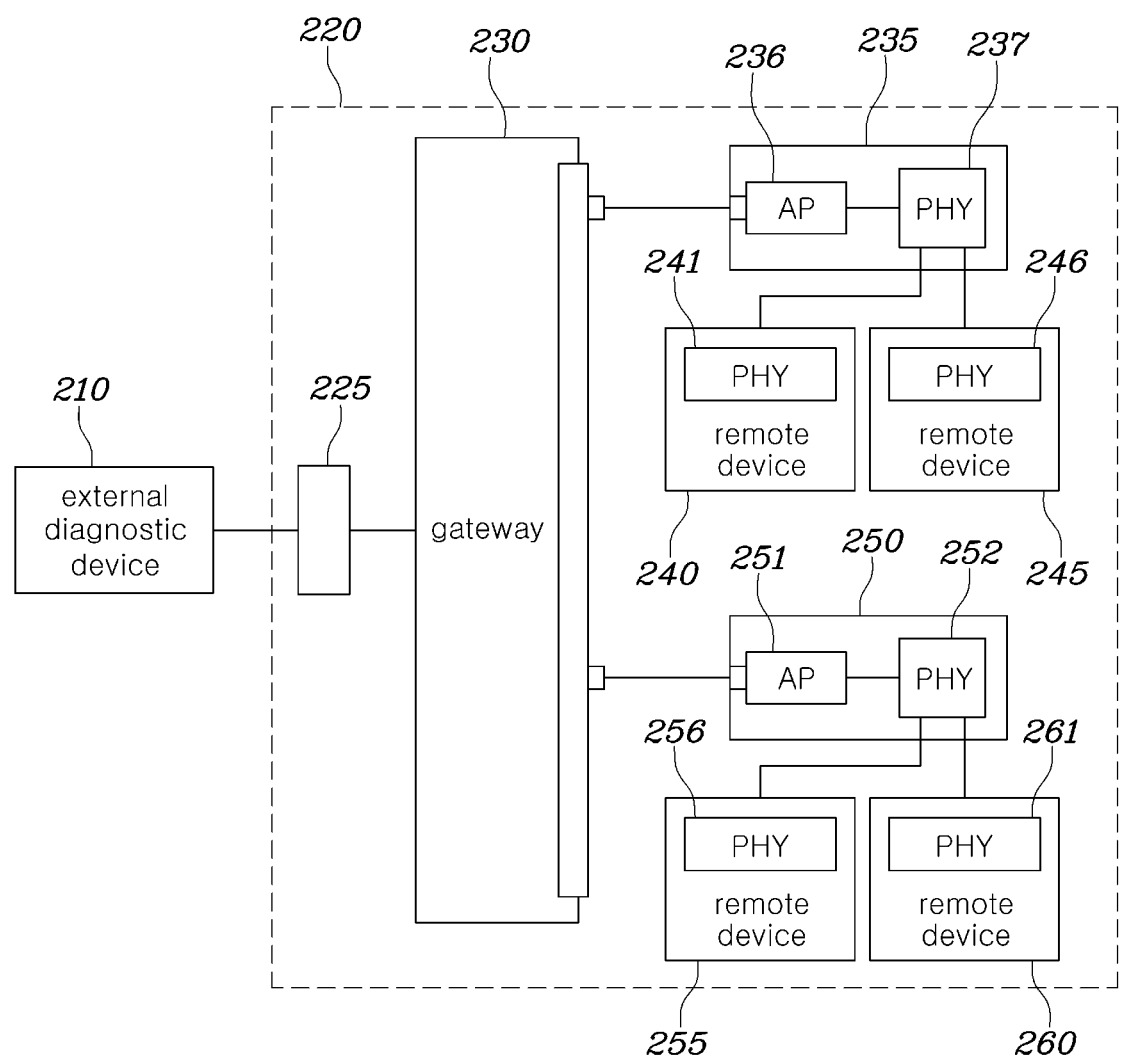
FIG. 2 is a diagram illustrating an example of an in-vehicle diagnostic communication system according.

FIG. 2 schematically illustrates a configuration of an in-vehicle diagnostic communication system.

With reference to FIG. 2, an in-vehicle diagnostic communication system 200 includes an external diagnostic device 210 and an in-vehicle network 220.

The external diagnostic device 210 performs diagnostics on the communication nodes 235, 240, 245, 250, 255, and 260 in the in-vehicle network 220.

Here, the external diagnostic device 210 may communicate with the in-vehicle network 220 through the on-board diagnostics (OBD) port 225.

Here, the external diagnostic device 210 may be a tablet PC outside the vehicle, and the user may diagnose the vehicle through a vehicle diagnostic app installed in the tablet PC.

The in-vehicle network 220 includes an onboard diagnostics port 225, a gateway 230, first and second local devices 235, 250, and first to fourth remote devices 240, 245, 255, 260.

The gateway 230 connects different networks. For example, the gateway 230 may establish connections between the on-board diagnostic port 225 supporting a D-HSCAN communication protocol and the first and second local devices 235 and 250 supporting an Ethernet communication protocol.

The first local device 235 may be connected to at least one of the first and second remote devices 240 and 245. The first local device 235 may interconnect the first and second remote devices 240 and 245 and control the first or second remote devices 240 and 245.

The second local device 250 may be connected to at least one of the third and fourth remote devices 255 and 260. The second local device 250 may interconnect the third and fourth remote devices 255 and 260 and control the third or fourth remote devices 255 and 260.

Here, the first and second local devices 235 and 250 may be different electronic control units (ECUs), respectively.

Here, the first and second local devices 235 and 250 may respectively include at least one AP module 236 and 251 and at least one physical (PHY) communication module 237 and 252.

Here, each of the AP modules 236 and 251 may communicate with the external diagnostic device 210 via the gateway 230, and each of the physical communication modules 237 and 252 may communicate with the remote devices 240, 245, 255, and 260 connected to each of the local devices 235 and 250 through channels set in the communication module.

The first to fourth remote devices 240, 245, 255, and 260 included in the vehicle may be controlled by the local devices 235 and 250 connected respectively thereto or may communicate with the local devices 235 and 250.

Here, the first and second remote devices 240 and 245 may be the first cam 240 and the first display 245, respectively, and the third and fourth remote devices 255 and 260 may be the second cam 255 and the second display 260, respectively.

In this case, the first and second remote devices 240 and 245 may communicate with the first local device 235 through communication channels set in the respective physical (PHY) communication modules 241 and 246, and the third and fourth remote devices 255 and 260 may communicate with the second local device 250 through communication channels set in the respective physical communication modules 256 and 261.

According to the in-vehicle diagnostic communication system 200 of FIG. 2, when the external diagnostic device 210 transmits a diagnostic command including a controller ID, a service ID, a diagnostic ID (DID), and a setting value, the gateway 230 forwards the diagnostic command to a local device corresponding to the controller ID, and the local device performs diagnostics based on the diagnostic command and transmit a diagnostic result including the controller ID, the service ID, the DID, and the result value to the external diagnostic device in response to the diagnostic command.

Figure 3:
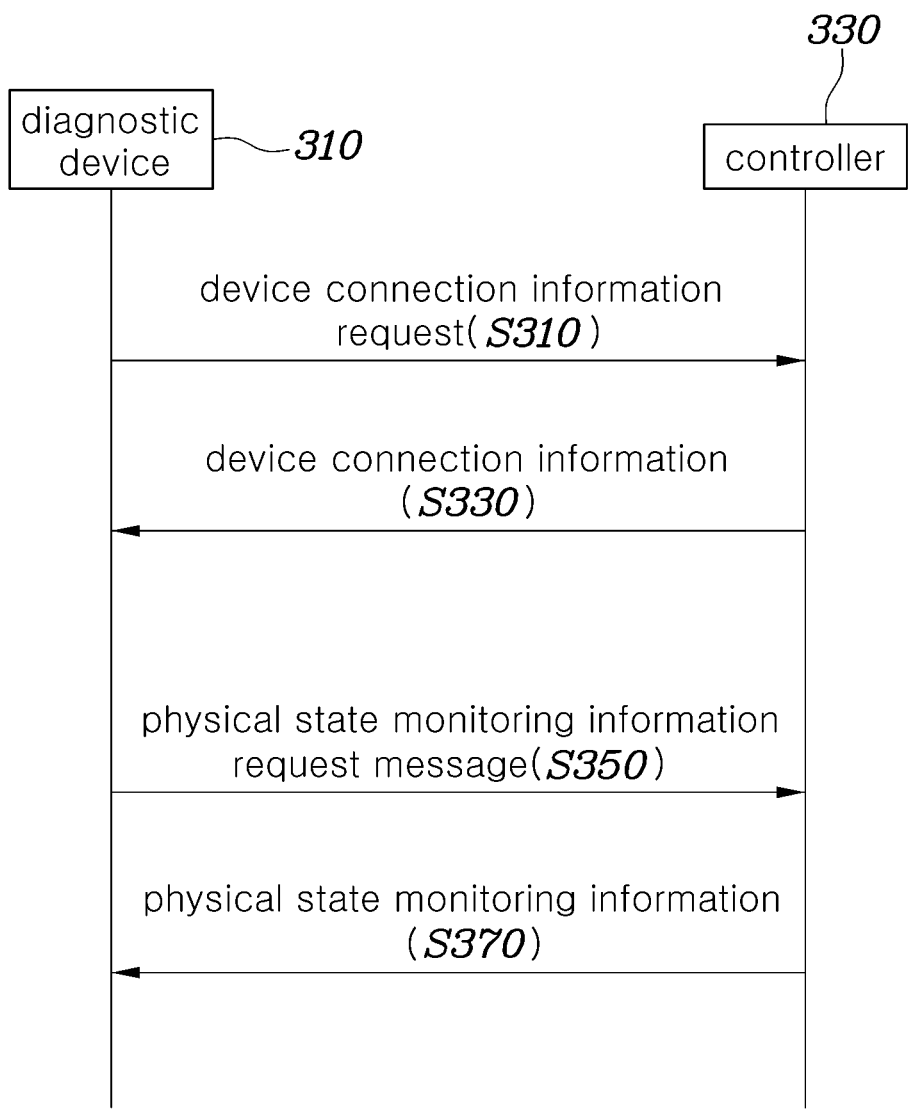
FIG. 3 is a signal flow diagram illustrating data transmission/reception between a diagnostic device and a controller for obtaining diagnostic information of a local device.

FIG. 3 is a signal flow diagram illustrating data transmission/reception between a diagnostic device and a controller for obtaining diagnostic information of a local device.

With reference to FIG. 3, the diagnostic device 310 transmits, at step S310, a request for information on a device connected to the controller 330.

Here, the diagnostic device 310 may be an External Diagnosis Tester (EDT), and the controller 330 may be an Electronic Control Unit (ECU).

Here, the message requesting for information on the connected device may include a service identifier (ID) and a diagnostic ID.

Table 1 below shows a list of diagnostic services that may be transmitted from the diagnostic device 310 to the controller 330.

TABLE 1

| Service | Service ID (HEX) | Diagnostic ID (HEX) | Description | Mnemonic |
|---|---|---|---|---|
| ReadDataByIdentifier | 22 | A001 | Get ECU information | DID_PIF |
|  |  | A002 | State Monitor | DID_PSM |
| ReadMemoryByAddress | 23 | 1A | Channel State Monitor | DID_PCSM |

The device connection information request may be a message defined as DID_PIF in Table 1 above.

Table 2 below shows the data structure of the device connection information request message.

TABLE 2

| Data Byte | Parameter Name | Hex Value | Mnemonic |
|---|---|---|---|
| #1 | Service ID | 22 (ReadDataByIdentififer Req) | RDBI |
| #2-#3 | Identifier | A001 (Get ECU Info Identifier) | DID_PIF |

With reference to Table 2, the device connection information request transmitted from the diagnostic device 310 to the controller 330 may have a size of 3 bytes, and may include a service ID of 1 byte and a diagnostic ID of 2 bytes.

Here, the service ID included in the device connection information request includes '22', and the diagnostic ID may include 'A001'.

Here, the service ID '22' indicates data read service by the identifier, and the diagnosis ID 'A.001' indicates acquisition of ECU information by the identifier.

Accordingly, the device connection information request includes a data read request by an identifier and an ECU information acquisition request by an identifier.

Next, the controller 330 transmits, at step S330, the device connection information to the diagnostic device 310 in response to the device connection information request.

Here, the device connection information may include an acknowledgement message of Table 3 or a negative acknowledgement message of Table 4 below.

TABLE 3

| Data Byte | Parameter Name | Hex Value | Mnemonic |
|---|---|---|---|
| #1 | Service ID | 62 (Pos. Resp. Of ReadDataByIdentifier) | RDBIPR |
| #2-#3 | Identifier | A001 (Get ECU Info Identifier) | DID_PIF |
| #4 | deviceID | XX | |
| #5 | channelTotalNum | XX | |
| #6-#12 | Per-channel Information #1 | XX | |
| #6m + 1-6m + 7 | Per-channel Information #n | XX | |

In Table 3, the deviceID represents the controller's own identifier, channelTotalNum represents the total number of physical (PHY) channels connected to the controller, and the per-channel information includes information on the identifier of the controller channel, the identifier (ID) of the other controller connected to the channel, and the identifier of respective channel configured to the other controller connected to the channel. With reference to Table 3, the acknowledgement message transmitted from the controller 330 to the diagnostic device 310 may have a size of 6m+7 bytes (m is an integer) and include a service ID of 1 byte, a diagnostic ID of 2 bytes, a number of channels of 1 byte, and per-channel information of 6m+2 bytes.

Here, the service ID included in the acknowledgement message includes '22', and the diagnosis ID may include 'A001'.

Here, the service ID '62' indicates that data has been read by the identifier, and the diagnosis ID 'A.001' indicates that ECU information has been obtained by the identifier.

With reference to Table 3, it is possible to identify that the acknowledgement message includes information on an indication message indicative of the data read by an identifier, an indication message indicative of ECU information acquired by the identifier, a controller's own ID, a total number of PHY channels connected to the controller, an identifier of the controller channel, the counterpart controller ID connected to the channel, the identifier of the counterpart controller channel.

TABLE 4

| Data Byte | Parameter Name | Hex Value | Mnemonic |
|---|---|---|---|
| #1 | Service ID | 7F (Neg. Resp. Of DiagnosticSessionControl) | DSCPR |
| #2 | Identifier | 11 (ECUReset Req) | DS_ |
| #3 | ResponseCode | 12 (subFunctionNotSupported) | RC_SFNS |
| | | 13 (incorrectMessageLengthOrInvalidFormat) | RC_IMLOIF |
| | | 22 (conditionsNotCorrect) | RC_CNC |

With reference to Table 4, the negative acknowledgement message transmitted from the controller 330 to the diagnostic device 310 may have a size of 3 bytes and include a service ID of 1 byte, a diagnostic ID of 1 byte, and a response code of 1 byte.

Here, the service ID included in the negative acknowledgement message includes '7F', the diagnosis ID may include '11', and the response code may include one of '12', '13', and '22'.

Here, the service ID '7F' indicates that diagnostic session control is not possible, and the diagnosis ID '11' indicates an ECU initialization request. Meanwhile, the response code '12' indicates that the sub-function is not supported, the response code '13' indicates that the length or format of the message is incorrect, and the response code '22' indicates that the condition is incorrect.

With reference to Table 4, it is possible to identify that the negative acknowledgement message includes an indication message indicating that the diagnostic session control is not possible, an ECU initialization request, and information on the cause of the error.

Next, the diagnostic device 310 transmits, at step S350, a physical state monitoring information request to the controller 330.

Here, the physical state monitoring information request is a message requesting information on the state of the physical (PHY) chip in the controller and may be a message defined by the symbol of DID PSM in Table 1 above.

Table 5 below shows the data structure of the physical state monitoring information request.

TABLE 5

| Data Byte | Parameter Name | Hex Value | Mnemonic |
|---|---|---|---|
| #1 | Service ID | 22 (ReadDataByIdentifier Req) | RDBI |
| #2-#3 | Identifier | A002 (PHY State Monitor) | DID_PSM |

With reference to Table 5, the request for the physical state monitoring information may have a size of 3 bytes, and may include a service ID of 1 byte and a diagnosis ID of 2 bytes.

Here, the service ID included in the physical state monitoring information request includes '22', and the diagnosis ID may include 'A002'.

Here, the service ID '22' indicates a data read service by an identifier, and the diagnosis ID 'A002' indicates a request for status monitor information of a specific physical (PHY) chip in the controller.

The physical state monitoring information request includes a data read request and a physical state request that are identified by identifier.

Next, the controller 330 transmits, at step S370, the physical state monitoring information in response to the physical state monitoring information request.

Here, the physical state monitoring information may include an acknowledgement message of Table 6 below.

TABLE 6

| Data Byte | | Parameter Name | Hex Value | Mnemonic |
|---|---|---|---|---|
| #1 | | Service ID | 62 (Pos. Resp. Of ReadDataByIdentifier) | RDBIPR |
| #2-#3 | | Identifier | A002 (PHY State Monitor) | DID_PSM |
| #4-#12 | Main Block | PCKT_HDR | 00 02 01 (Main = 01) (Key Index 2 bytes + Value 1 byte) | DREC_DATA_1~3 |
| | | TBL_VER | (Key Index 2 bytes + Value 1 byte) | DREC_DATA_4~6 |
| | | BLK_CNT | 00 03 XX (Block Count = XX) | DREC_DATA_7~9 |
| #13-#n + 3 | Chip Block | PCKT_HDR | 00 02 02 (Main = 02) | DREC_DATA_10~n |
| | | RCD_KEY_CNT | 00 04 XX (Block Count = XX) | |
| | | CHIP_ID | 00 05 XX | |
| | | DEVICE_ID | 00 06 XX | |
| | | CH_NO | 00 12 XX | |
| | | . . . | XX~XX | |
| | Log Block | PCKT_HDR | 00 02 03 (Main = 03) | |
| | | RCD_KEY_CNT | 00 04 XX | |
| | | LOG_DUMP | 00 23 XX~XX | |
| | | . . . | XX~XX | |

The data defined in Table 6 includes state values of all communication physical (PHY) chips stored in the controller 330.

With reference to Table 6, the physical state monitoring information includes a header field and a data field. In the main block, TBL_VER indicates the version of the currently defined table, and BLK_CNT indicates the number of chips included in the controller.

The header field includes a service ID of 1 byte and a diagnostic ID of 2 bytes.

The data field includes three types of blocks, i.e., a main block, a chip block, and a log block, and respective block includes a set of values pairing a key index and a value.

Figure 4:
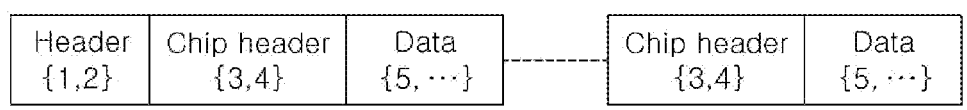
FIG. 4 is a diagram illustrating an example of structure of PSM data.
Figure 5:
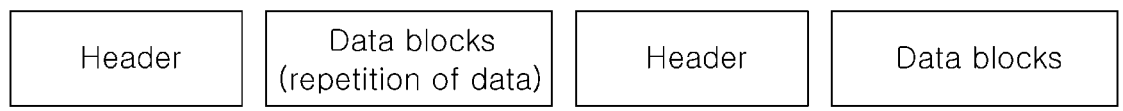
FIG. 5 is a diagram illustrating an example of structure of a PHY state monitor record.

FIG. 5 illustrates an example of the structure of the physical state monitoring information. With reference to FIG. 4, the physical state monitoring information may include a header, a chip header, and data. In this case, the header may include a main block header, the chip header may include a chip block header, and the data may include main block data, chip block data, and log blocks.

Figure 6:
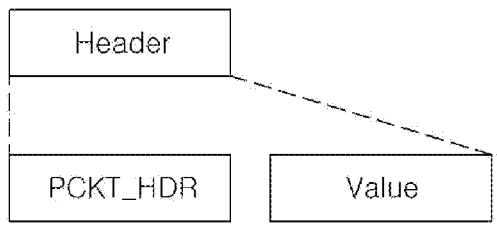
FIG. 6 is a diagram illustrating an example of structure of a header in the PHY status monitor record of FIG. 5.

Meanwhile, in Table 6, respective block includes a header and data as shown in FIG. 5. The header block of FIG. 5 includes a key index and a value for type classification as shown in FIG. 6.

Here, the key index has one of the values defined in Table 7 below according to the type of data.

TABLE 7

| Primary Key Index (Hex) | Customer Data | Mnemonic | Unit Size (Byte) | Format |
|---|---|---|---|---|
| 0000h | Reserved block (No Data Region) | RSVD_BLK | 1 | Fill with 00 |
| 0001h | Used Table Version | TBL_VER | 1 | Value |
| 0002h | Packet Header (01: packet, 02: Chip, 03: Log) | PCKT_HDR | 1 | Value |
| 0003h | Block Count (number of blocks) | BLK_CNT | 1 | Size |
| 0004h | Block Key Count (number of Keys included in Block) | BLK_KEY_CNT | 1 | Size |
| 0005h | CHIP_ID | CHIP_ID | 1 | Value |
| . . . | . . . | | | |
| 0012h | Connected Channel Number | CH_NO | 1 | Number of Repetitions, Values |
| 0013h | DEC ERROR | DEC_ERR_A | 1 | Number of Repetitions, Values |
| 0014h | IDLE ERROR | IDLE_ERR | 1 | Number of Repetitions, Values |
| . . . | . . . | | | |
| 0110h | Log dump | LOG_DUMP | 1 | Size, Values |

With reference to Table 7, it is possible to identify that the header has a key index of '0002h'.

Meanwhile, the value for classifying the types constituting the header has the values shown in Table 8 below according to the header type.

TABLE 8

| Header Type | Value |
| --- | --- |
| Main Header | 0x01 |
| Chip Header | 0x02 |
| Log Header | 0x03 |

With reference to Table 8, it is possible to identify that the main header has a value of '0x01', the chip header has a value of '0x02', and the log header has a value of '0x03'.

Figure 7:
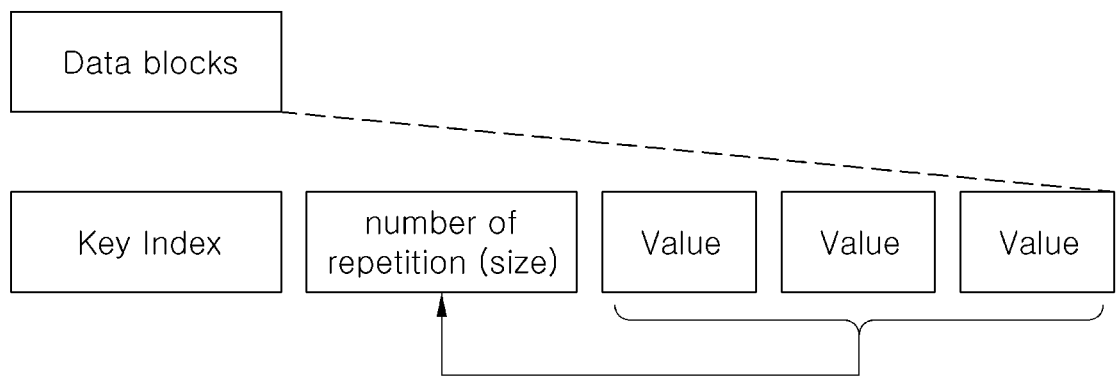
FIG. 7 is a diagram illustrating an example of structure of a data block in a PHY status monitor record of FIG. 5.

The data blocks of FIG. 5 include a key index, the number of repetitions of data, and values as shown in FIG. 7. Here, the data has a different data structure depending on the type of record, i.e., block.

The main block includes version information of a data index table used in a low-voltage differential signaling (LVDS) status monitor and the number of blocks received as a response result. PCKT_HDR is '0x01' indicating the header type of main, and TBL_VER is '0x01' indicating the currently used Data Index Table 1. Also, the number of blocks received as a result of the response is stored in BLK_CNT. Unlike other records, the main block has a fixed size.

Meanwhile, the chip block includes the total number of data with which the corresponding chip responds, the chip identifier (chip_id), a list of channel numbers (channel No.) connected to the chip, and state data (state data). Since the header type is a chip, PCKT_HDR is '0x02', and RCD_KEY_CNT indicates the total number of CHIP_ID, DEVICE_ID, CH_NO, and Data Index. The chip identifier (CHIP_ID) designated to the corresponding chip corresponds to the chip identifier (chipID) included in the response message transmitted at step S330. DEVICE_ID corresponds to a device identifier (deviceID) included in the response message transmitted at step S330. CH_NO corresponds to an identifier (uniqueNO) included in the response message transmitted at step S330. Also, CH_NO indicates the number of channels connected to the chip. Data indices are listed as many as the number of keys that the chip may respond to. Here, since the values of the data indices may exceed 1 byte, they are composed of a data size and a data value. Bytes 1 to 15 have a fixed size, and subsequent data have a flexible data size according to the state of the chip.

The log block includes a header and LOG DUMP. LOG DUMP is arbitrary data provided by the controller. In the case where an event occurred in the controller or status information at the time of occurrence of a problem is recorded, data may be acquired through LOG DUMP when using LVDS diagnosis. RCD_KEY_CNT indicates the total number of LOG_DUMPs. Here, the number of LOG_DUMPs from 1 to 6 is fixed, and the number of remaining LOG_DUMPs increases by the size of the log which the controller responds.

Meanwhile, the controller 330, when not supporting the diagnostics, transmits a negative acknowledgement message at step S370. In this case, the negative acknowledgement message may include a value of serviceNotSupported(11h).

Figure 8:
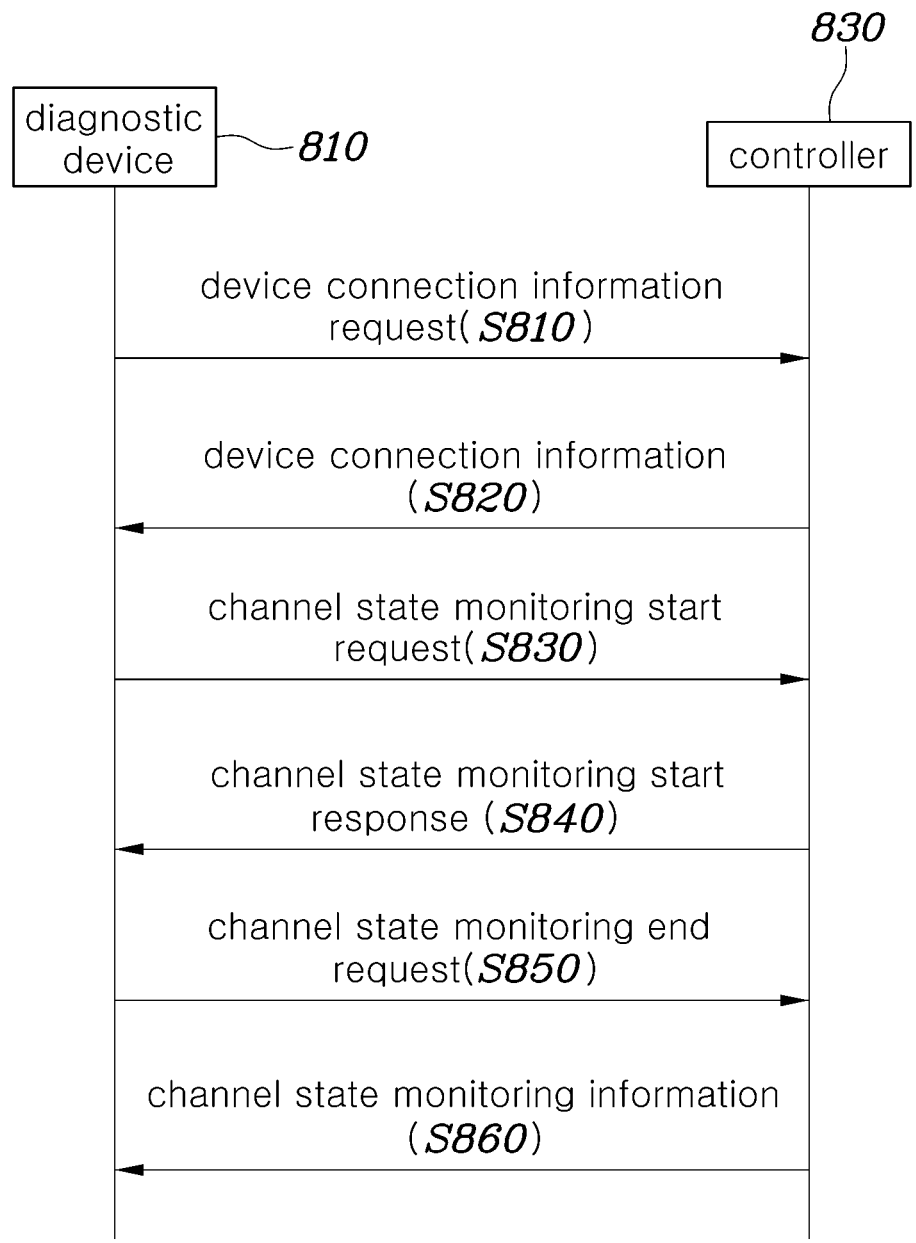
FIG. 8 is a signal flow diagram illustrating data transmission/reception between a diagnostic device and a controller for obtaining diagnostic information of a remote device.

FIG. 8 is a signal flow diagram illustrating data transmission/reception between a diagnostic device and a controller for obtaining diagnostic information of a remote device.

With reference to FIG. 8, the diagnostic device 810 transmits, at step S810, a device connection information request to the controller 830.

The device connection information request may be a message defined as DID_PIF in Table 1 above.

Next, the controller 830 transmits, at step S820, a response message to the diagnostic device 310 in response to the device connection information request.

Here, the response message may include the acknowledgement message of Table 3 or a negative acknowledgement message of Table 4.

Next, the diagnostic device 810 transmits, at step S830, a physical channel state monitoring start request to the controller 830.

Next, the controller 830 transmits, at step S840, the physical channel state monitoring start response message in response to the physical state monitoring information request.

Next, the diagnostic device 810 transmits, at step S850, a physical channel state monitoring start request to the controller 830.

Next, the controller 830 transmits, at step S860, a physical channel state monitoring start message in response to the physical channel state monitoring start request to the diagnostic device 810.

Table 9 below shows the data structure of physical channel state monitoring start and end requests.

TABLE 9

| Data Byte | Parameter Name | | Hex Value | Mnemonic |
| --- | --- | --- | --- | --- |
| #1 | Service ID | | 23 (Request) | RMBA |
| #2 | addressAndLengthFormatIdentifier | | 14 | ALFID |
| #3 | memoryAddress | LVDS | D (Diagnostic) | MA_B1[7:4] |
| | | SID | X (Ref. to SID Parameters) | MA_B1[3:0] |
| #4 | | DID | A1 (PHY State Monitor) | MA_B2 |
| #5-#6 | | Parameter | XXXX (Ref. to SID Parameters) | MA_B3~4 |
| #7 | memorySize | MemSize | XX (Ref. to SID Parameters) | MS_B1 |

With reference to Table 9, the physical channel state monitoring start and end requests may have a size of 7 bytes and include an identifier of an address and length format of 1 byte (addressAndLengthFormatIdentifier), a memory address of 4 bytes, and a memory size of 1 byte. Table 10 below shows the data structure of the physical channel state monitoring start and end response messages.

TABLE 10

| Data Byte | Parameter Name | | Hex Value | Mnemonic |
|---|---|---|---|---|
| #1 | Service ID | | 63 (Pos. Resp. Of ReadMemoryByAddress) | RMBAPR |
| #2-#n | dataRecord | Size | XX (Ref. to SID Parameters) | DREC_DATA_1 |
| | DID | | A1 (PHY State Monitor) | DREC_DATA_2 |
| | | SID | 0X (Ref. to SID Parameters) | DREC_DATA_3 |
| | | Parameter | XX~(Ref. to SID Parameters) | DREC_DATA_4~n |

With reference to Table 10, it is possible to identify that the physical channel state monitor message may have a size of n bytes, and includes a service ID of 1 byte, a message size of 1 byte, a DID of 1 byte, a SID of 1 byte, and parameters.

Here, the message size of 1 byte indicates the data size of the channel state monitor information transmitted at step S860.

Here, the data size may be a value expressed in units of bytes.

The messages transmitted and received at steps S830 to S860 may be sent and received in the message format defined in Table 11 below as an example.

TABLE 11

| Step (Step#) | Parameter Name | | | Hexadecimal Value (Hex Value) | Mnemonic |
|---|---|---|---|---|---|
| Test Start | SID | | SID_TSRT | 0 | MA_B1[3:0] DREC_DATA_3[3:0] |
| | Request | | | 23 14 D0 1A [Remote][ChannelNo] 00 05 Diagnostics Start Transmit target channel information of controller using Parameter | |
| | | | Remote[7] | 0b0 (Local), 0b1 (Remote) | MA_B3[7] |
| | | | ChannelNo[6:0] | 01~7F (Ch#) | MA_B3[6:0] |
| | | | Reserved | 00 | MA_B4 |
| | | | MemSize | 05 | MS_B1 |
| | Response | | | 63 04 1A 00 [Remote][ChannelNo] [ReturnDataSize] Return input Remote and Channel values Set DREC_DATA_4 = FF when there is no channel or SID cannot be executed. | |
| | | | Size | 04 | DREC_DATA_1 |
| | | | Remote[7] | 0b0 (Local), 0b1 (Remote) | DREC_DATA_4[7] |
| | | | ChannelNo[6:0] | 01~7F (Ch#) | DREC_DATA_4[6:0] |
| | | | ReturnDataSize | XX | DREC_DATA_5 |
| Test Finish | SID | | SID_TF | F | MA_B1[3:0] DREC_DATA_3[3:0] |
| | Request | | | 23 14 DF 1A [Remote][ChannelNo] 00[MemSize] Diagnostics End Transmit target channel information to Controller using Parameter | |
| | | | Remote[7] | 0b0 (Local), 0b1 (Remote) | MA_B3[7] |
| | | | ChannelNo[6:0] | 01~7F (Ch#) | MA_B3[6:0] |
| | | | Reserved | 00 | MA_B4 |
| | | | MemSize | XX (ReturnDataSize + 4) | MS_B1 |

TABLE 11-continued

| Step (Step#) | Parameter Name | | Hexadecimal Value (Hex Value) | Mnemonic |
|---|---|---|---|---|
| | Response | | 63 [Size] 1A 0F [Remote][ChannelNo] [CSMRecord] Return Diagnostics Result Value Set DREC_DATA_4 = FF when there is no channel or SID cannot be executed. | |
| | | Size | XX (ReturnDataSize + 3) | DREC_DATA_1 |
| | | Remote[7] | 0b0 (Local), 0b1 (Remote) | DREC_DATA_4[7] |
| | | ChannelNo[6:0] | 01~7F (Ch#) | DREC_DATA_4[6:0] |
| | | CSMRecord | XX~XX (Channel state monitor Information) | DREC_DATA_5~n |

With reference to Table 11, the diagnostic device 810 may transmit, at step S830, a message of '23 14 D0 LA [Remote] [ChannelNo] 00 05' to the controller 830. Next, the controller 830 may transmit, at step S840, a message of '63 [Size] LA 0F [Remote] [ChannelNo][ReturnDataSize]' to the diagnostic device 810 in response thereto. Meanwhile, the diagnostic device 810 may transmit, at step S850, a message of '23 14 DF LA [Remote] [ChannelNo] 00 [MemSize]' to the controller 830, and the controller 830 may transmit, at step S860, a message of '63 [Size] LA 0F [Remote] [ChannelNo] [CSMRecord]' to the diagnostic device 810 in response thereto. Here, when there is no channel or SID cannot be executed, [ChannelNo] indicating the channel number is set to 'FF'. Here, the [Remote] indicates whether the diagnosis target device is a local device or a remote device, and is set to a value of '0b0' to indicate a local device and a value of '0b1' to indicate a remote device. Meanwhile, [ChannelNo] to which the diagnosis target device is connected indicates a channel number and has a value between 01 and 7F. Here, [ReturnDataSize] from the controller 830 to the diagnostic device 810 indicates the size of a data record included in a returned response message, and [CSMRecord] indicates channel state monitor information.

Hereinafter, a method of configuring channel state monitor information will be described.

For example, in order to report DEC ERROR and IDLE ERROR for two chips whose ChipIDs are 0x1A (with 1 channel) and 0x1B (with 2 channels) in the controller, the channel state monitor information may be configured as follows.

First, the channel state monitor information about the 0x1A chip may be configured as follows.

The key index of the packet header is 0x0002, and '02' indicating the chip block is put in the value according to the type of the block. Accordingly, the packet header may be configured as '00 02 02'.

Meanwhile, the data may be configured as shown in Table 12 below.

TABLE 12

| Type | Mnemonic | Key Index | Number of Data Repetitions | Value | The mean of value |
|---|---|---|---|---|---|
| Chip#1 | RCD_KEY_CNT | 00 04 | X | 04 | Number of Keys |
| | CHIP_ID | 00 05 | X | 1A | Identifier of chip |
| | CH_NO | 00 12 | 01 | 01 | Controller ID including Chip |
| | DEC_ERR | 00 13 | 01 | 00 | Number of DEC errors |
| | IDLE_ERR | 00 14 | 01 | 00 | Number of Idle errors |

Figure 9:
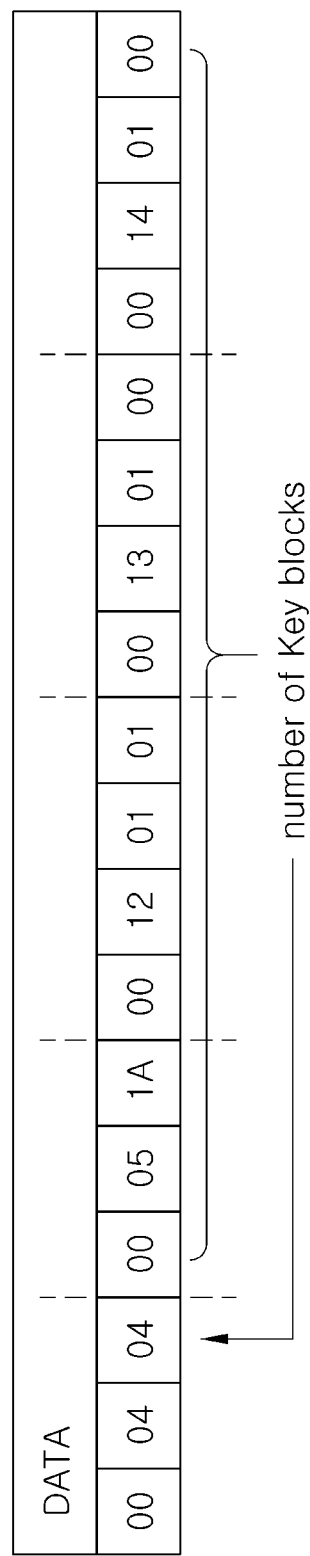
FIG. 9 is a diagram illustrating an example of data structure configuring channel state information of a 0x1A chip.

With reference to Table 12, key indices of RCD_KEY_CNT, CHIP_ID, CH_NO, DEC_DRR, and IDLE_ERR are 0004, 0005, 0012, 0013, and 0014, respectively. Meanwhile, the number of data repetitions of CH_NO, DEC_ERR, and IDLE_ERR may be configured to have a value of 01 indicating the number of channels. Meanwhile, CH_NO may have a value of 01, which is a unique value of a channel configured in a corresponding chip. Here, DEC_ERR and IDLE_ERR may have a value of 00 when no error occurs. FIG. 9 illustrates a structure of data representing channel state monitor information of a chip configured as shown in Table 12.

Meanwhile, first, the channel state monitor information about the 0x1B chip may be configured as shown in Table 13 below.

TABLE 13

| Type | Mnemonic | Key Index | Number of Data Repetitions | Value | The mean of value |
|---|---|---|---|---|---|
| Chip#2 | RCD_KEY_CNT | 00 04 | x | 04 | Number of Keys |
| | CHIP_ID | 00 05 | x | 1B | Identifier of chip Identifier assigned to channel of Chip |
| | CH_NO | 00 12 | 02 | 02 03 | Controller ID including Chip |
| | DEC_ERR | 00 13 | 02 | 00 00 | Number of DEC errors |
| | IDLE_ERR | 00 14 | 02 | 00 00 | Number of Idle errors |

Figure 10:
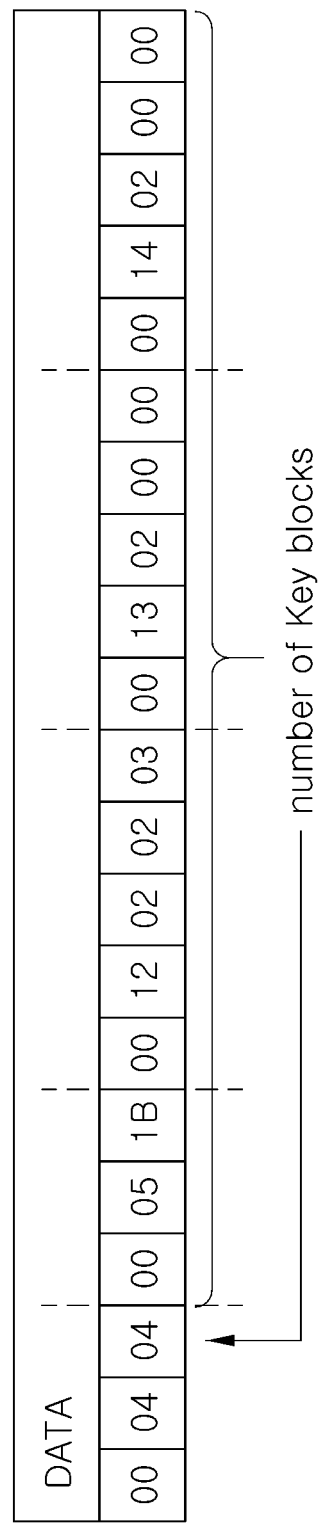
FIG. 10 is a diagram illustrating another example of data structure configuring channel state information of a 0x1B chip.

With reference to Table 13, the key indices of RCD_KEY_CNT, CHIP_ID, CH_NO, DEC_DRR, and IDLE_ERR are 0004, 0005, 0012, 0013, and 0014, respectively. Meanwhile, the number of data repetitions of CH_NO, DEC_ERR, and IDLE_ERR may be configured to have a value of 02 indicating the number of channels. Meanwhile, the value of CH_NO may have a value of 02 03, which is a unique value of two channels configured in a corresponding chip. Here, DEC_ERR and IDLE_ERR may have a value of 00 00 when no errors occur in both channels. FIG. 10 illustrates a structure of data representing channel state monitor information of a chip configured as shown in Table 13 above.

Meanwhile, the main block may include a header and data, and the header may be configured with '00 02 01' including a key index of '00 02' a value of '01' indicating main block among the data types. Also, the data of the main block may include a key index and a value indicating the table version and the number of chips as shown in Table 14 below.

TABLE 14

| | Key Index | Value |
|---|---|---|
| TBL_VER | 00 01 | 01 |
| BLK_CNT | 00 03 | 02 |

With reference to Table 14, it is possible to identify that the main block includes '01' informative of the table version and '02' informative of the number of chips.

Figure 11:
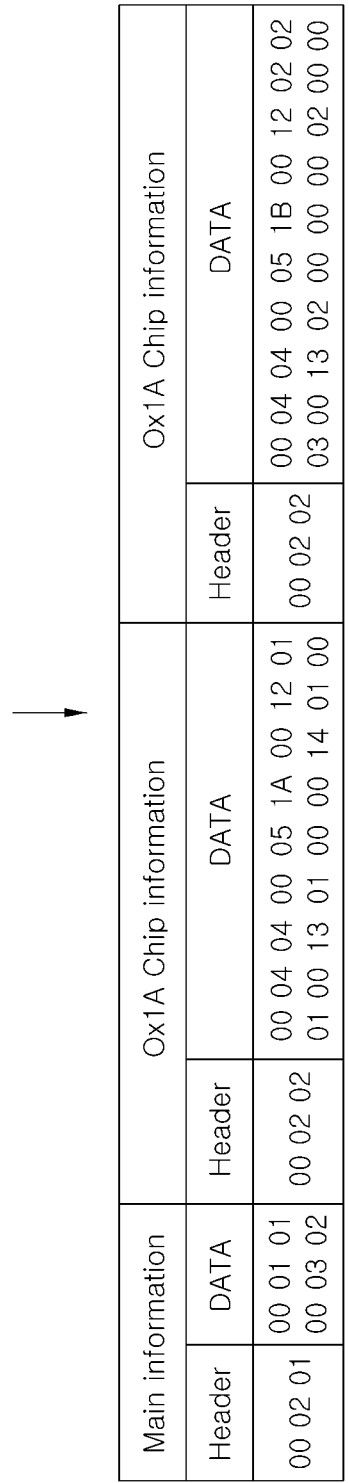
FIG. 11 is a diagram illustrating an example of overall data structure configuring channel state information.

The channel state monitor information configured by combining the information on the main block and information on the 0x1A and 0x1B chips may be configured as shown in FIG. 11.

Figure 12:
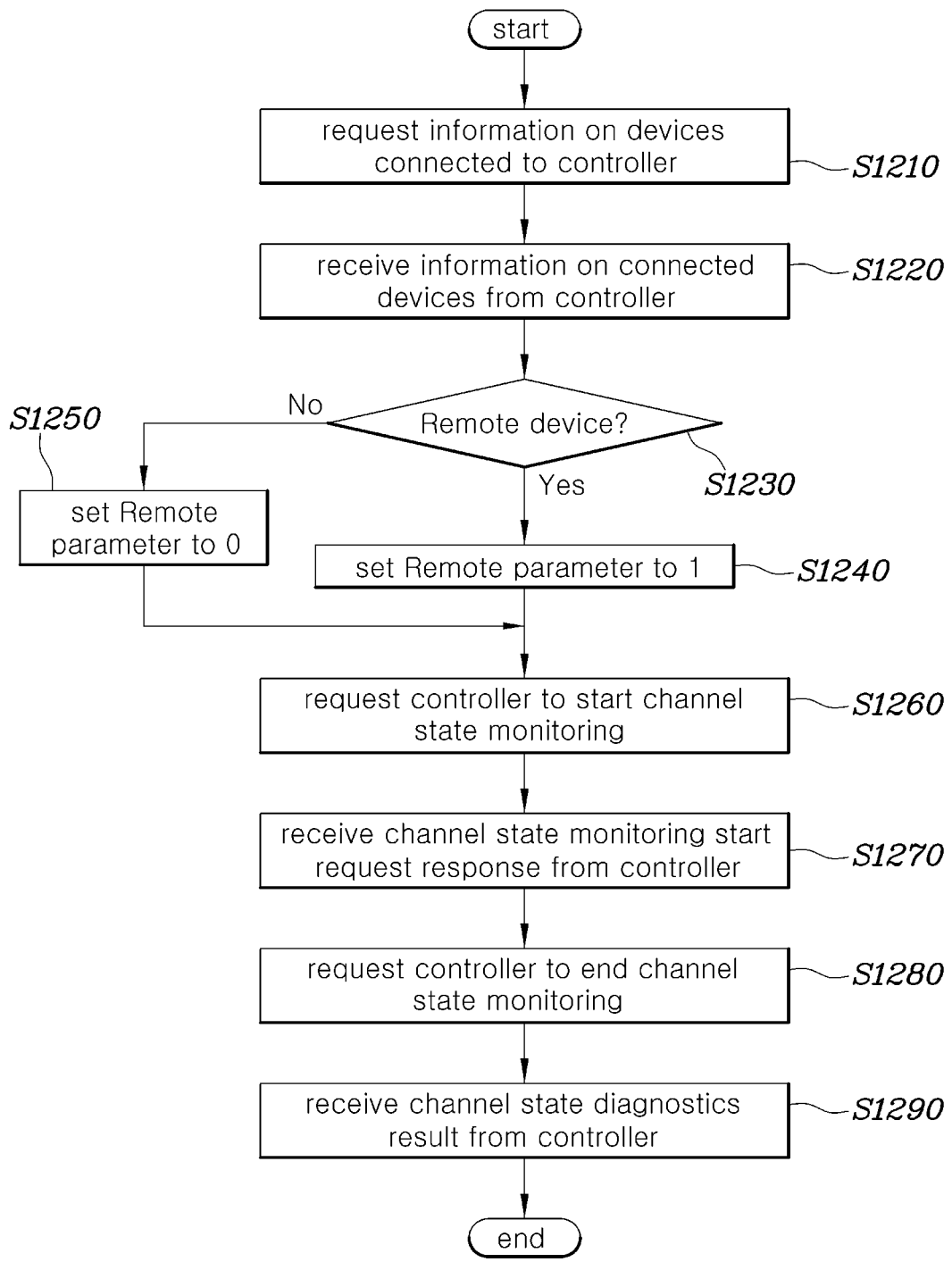
FIG. 12 is a flowchart illustrating an example of an in-vehicle device diagnosis method of a diagnostic device.

FIG. 12 is a flowchart illustrating an in-vehicle device diagnostics method of a diagnostic device.

With reference to FIG. 12, the diagnostic device requests, at step S1210, information on the device connected to the controller.

Here, the message requesting information on the connected device may include information as shown in Table 2.

Next, the diagnostic device receives, at step S1220, information on the connected device from the controller.

Here, the device connection information may include an acknowledgement message of Table 3 or a negative acknowledgement message of Table 4 below.

Next, the diagnostic device determines at step S1230 whether the device to be diagnosed is a local device or a remote device.

As a result of the determination, the diagnostic device sets, when the device to be diagnosed is a local device, the Remote parameter in the channel state monitoring start request message to 1 at step S1240 or sets, when the device to be diagnosed is a remote device, the Remote parameter in the channel state monitoring start request message to 0 at step 1250, and transmits, at step S1260, the channel state monitoring start request message to the controller.

Next, the diagnostic device receives, at step S1270, a response to the channel state monitoring start request message from the controller.

Next, the diagnostic device transmits, at step S1280, a channel state monitoring end request message to the controller.

Next, the diagnostic device receives, at step S1290, the channel state diagnostics result from the controller.

Here, the channel state monitoring start request message, the channel state monitoring start request response message, the channel state monitoring end request message, and the channel state diagnosis result may include information included in Table 11.

Figure 13:
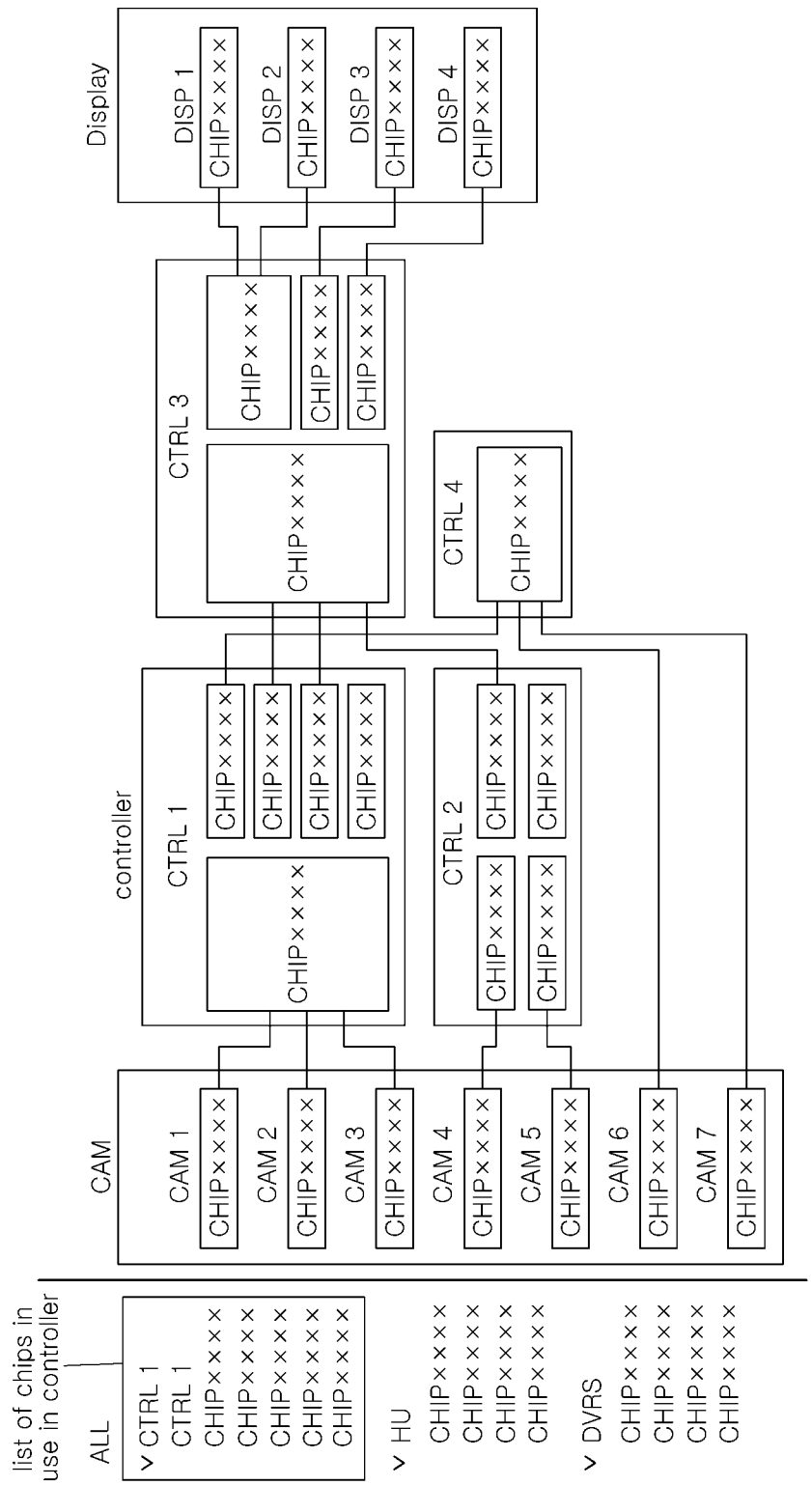
FIG. 13 is a diagram illustrating an example of a user screen of a diagnostic device.

FIG. 13 illustrates an example of a user screen of a diagnostic device.

With reference to FIG. 13, when the menu for requesting information on a device connected to the controller is executed by the diagnostic device, connection information of the controller may be checked through "Get ECU Info Message", a list of communication chips used in the controller is displayed on the left side of the screen, and a relationship of the devices connected to the selected chip is displayed on the right side of the screen.

FIG. 14 illustrates another example of a user screen of a diagnostic device.

With reference to FIG. 14, it is possible to identify that the diagnostic apparatus requests a channel state monitor from a controller and may receive information corresponding to Table 12 or Table 13 in response thereto.

Figure 15:
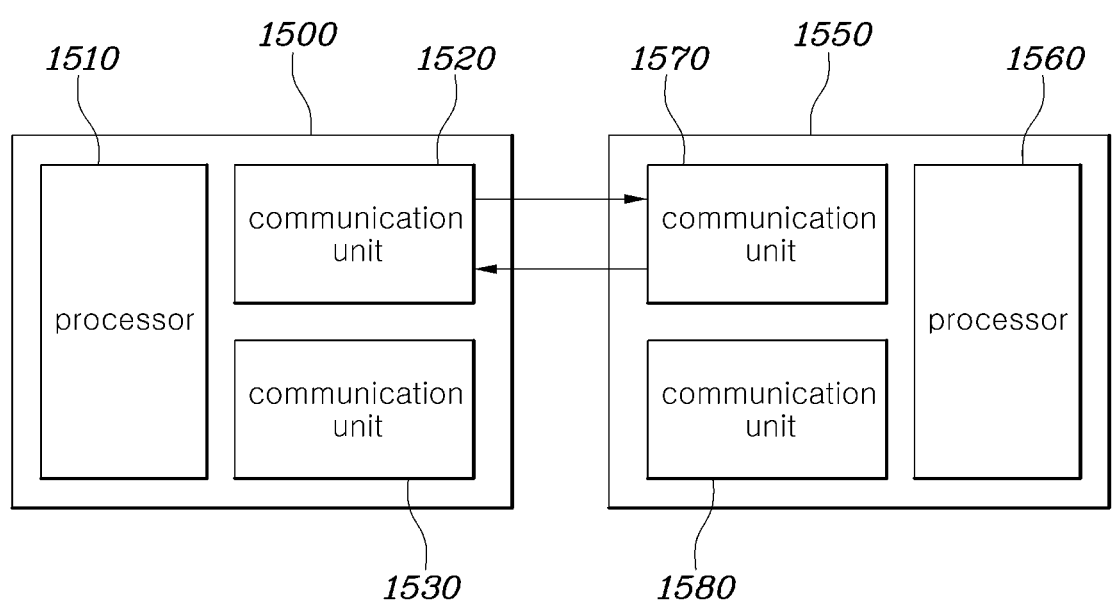
FIG. 15 is a block diagram illustrating a diagnostic device and a controller.

FIG. 15 is a block diagram illustrating a diagnostic device 1500 and a controller 1550.

With reference to FIG. 15, the diagnostic device 1500 includes a processor 1510, a communication unit 1520, and a memory 1530.

The processor 1510 may include an application-specific integrated circuit (ASIC), other chipsets, logic circuits, and/or data processing devices. The processor 1510 implements the in-vehicle device diagnostics method proposed in this specification.

In detail, the processor 1510 generates all messages transmitted to the controller disclosed in this specification, e.g., the connected device information request message of table 2 or the request message of Table 11.

The communication unit 1520 is connected to the processor 1510 to transmit and/or receive all information for implementing in-vehicle device diagnostics method. For example, the communication unit 1520 transmits an information request message about a device connected to the controller, receives information about the connected device from the controller, transmits the channel state diagnostics request message to the controller, and receives the channel state diagnostics result from the controller.

Memory 1530 may include read-only memory (ROM), random access memory (RAM), flash memory, memory cards, storage media, and/or other storage devices. The memory 1530 stores information for implementing the in-vehicle device diagnostics method. For example, the memory 1530 stores at least one of an information request message about a device connected to the controller, information on the device connected to the controller, a channel state diagnostics request message, and a channel state diagnostics result.

Meanwhile, the controller 1550 includes a processor 1560, a communication unit 1570, and a memory 1580.

The processor 1560 may include an application-specific integrated circuit (ASIC), other chipsets, logic circuits, and/or data processing devices. The processor 1560 implements the in-vehicle device diagnostics method proposed in this specification. In detail, the processor 1560 generates all messages transmitted to the diagnostic device disclosed in this specification, e.g., the acknowledgement message of table 3 or the negative acknowledgement message of table 4 and the response message of Table 11.

The communication unit 1570 is connected to the processor 1560 to transmit and/or receive all information for implementing in-vehicle device diagnostics method. For example, the communication unit 1570 receives an information request message about a device connected to the controller, transmits information about the connected device to the controller, receives the channel state diagnostics request message from the controller, and transmits the channel state diagnostics result to the controller.

Memory 1580 may include read-only memory (ROM), random access memory (RAM), flash memory, memory cards, storage media, and/or other storage devices. The memory 1530 stores information for implementing the in-vehicle device diagnostics method. For example, the memory 1580 stores at least one of an information request message about a device connected to the controller, information on the device connected to the controller, a channel state diagnostics request message, and a channel state diagnostics result.

What is claimed is:

1. An in-vehicle device diagnostic method of a diagnostic device, the method comprising:
    requesting, to a controller, information regarding one or more devices connected to the controller;
    receiving the information regarding the one or more connected devices from the controller;
    requesting, to the controller, channel state diagnostics for a channel to which, among the one or more devices connected to the controller, a diagnostics target device is connected; and
    receiving, responsive to the channel state diagnostics request, a channel state diagnostics result from the controller,
    wherein the channel state diagnostics result comprises a diagnostic result of the diagnostics target device,
    wherein the information regarding the one or more connected devices includes an acknowledgment message or a negative acknowledgement message, and
    wherein the acknowledgement message and the negative acknowledgement message have different data sizes.

2. The method of claim 1, wherein the channel state diagnostics result comprises an identifier assigned to a communication chip included in the controller, an identifier (ID) of the controller, and a number of errors occurring on the channel.

3. The method of claim 1, wherein the acknowledgement message comprises an identifier of the controller, a number of physical channels connected to the controller, and information regarding each respective physical channel connected to the controller.

4. The method of claim 3, wherein the information regarding each respective physical channel comprises an identifier assigned to each respective physical channel, identifiers of other controllers connected to each respective physical channels, and identifiers assigned to channels configured in the other controllers.

5. The method of claim 1, wherein requesting the channel state diagnostics comprises:
    transmitting, to the controller, a channel state monitoring start request for the channel to which the diagnostics target device is connected,
    receiving a response from the controller in response to the channel state monitoring start request, and
    transmitting a channel state monitoring stop request to the controller.

6. The method of claim 5, wherein the channel state monitoring start request comprises information regarding whether the diagnostics target device is a local device or a remote device, and information regarding the channel to which the diagnostics target device is connected.

7. The method of claim 5, wherein the response to the channel state monitoring start request comprises a data size of channel state monitor information.

8. A diagnostic device for diagnosing one or more in-vehicle devices, the diagnostic device comprising:
    a processor configured to generate (i) a message requesting information regarding one or more devices connected to a controller and (ii) a channel state diagnostic request message based on the information regarding the one or more devices connected to the controller; and
    a communication unit configured to:
        transmit, to the controller, the message requesting information regarding the one or more devices connected to the controller,
        receive, from the controller, information regarding the one or more connected devices,
        transmit, to the controller, the channel state diagnostics request message for a channel to which, among the one or more devices connected to the controller, a diagnostics target device is connected based on the received information, and receive, responsive to the channel state diagnostics request message, a channel state diagnostic result from the controller, wherein the channel state diagnostics result comprises a diagnostics result for the diagnostic target device, wherein the information regarding the one or more connected devices includes an acknowledgment message or a negative acknowledgement message, and wherein the acknowledgement message and the negative acknowledgement message have different data sizes.

9. The diagnostic device of claim 8, wherein the channel state diagnostics result comprises an identifier assigned to a communication chip included in the controller, an identifier (ID) of the controller, and a number of errors occurring on the channel.

10. The diagnostic device of claim 8, wherein the acknowledgement message comprises an identifier of the controller, a number of physical channels connected to the controller, and information regarding each respective physical channel connected to the controller.

11. The diagnostic device of claim 10, wherein the information regarding each respective physical channel comprises an identifier assigned to each respective physical channel, identifiers of other controllers connected to each respective physical channels, and identifiers assigned to channels configured in the other controllers.

12. The diagnostic device of claim 8, wherein the communication unit is configured to:

transmit, to the controller, a channel state monitoring start request for the channel to which the diagnostics target device is connected, receive a response from the controller based on the channel state monitoring start request, and transmit a channel state monitoring stop request to the controller.

13. The diagnostic device of claim 12, wherein the channel state monitoring start request comprises information regarding whether the diagnostics target device is a local device or a remote device and information regarding the channel to which the diagnostics target device is connected.

14. The diagnostic device of claim 12, wherein the response to the channel state monitoring start request comprises a data size of channel state monitor information.

\* \* \* \* \*